United States Patent [19]
Lee et al.

[11] Patent Number: 5,762,668
[45] Date of Patent: Jun. 9, 1998

[54] APPARATUS AND METHOD FOR DEENTRAINMENT IN A CHEMICAL PROCESS TOWER

[75] Inventors: Adam T. Lee, Richardson; Kuang Wu, Plano; Larry Burton, De Soto; Leon Fan, Carrollton, all of Tex.

[73] Assignee: Glitsch, Inc., Dallas, Tex.

[21] Appl. No.: 685,482

[22] Filed: Jul. 24, 1996

[51] Int. Cl.$^6$ ............................................. B01F 3/04
[52] U.S. Cl. ............................................. 55/486; 261/114.1
[58] Field of Search ............................ 261/114.1; 55/486

[56] References Cited

U.S. PATENT DOCUMENTS

| | | | |
|---|---|---|---|
| 3,218,048 | 11/1965 | Smith et al. | 261/94 |
| 3,450,393 | 6/1969 | Munters | 261/112 |
| 3,647,192 | 3/1972 | DeGroot et al. | 261/114.1 |
| 3,887,665 | 6/1975 | Mix et al. | 261/114 R |
| 3,959,419 | 5/1976 | Kitterman | 261/98 |
| 4,105,723 | 8/1978 | Mix | 261/105 |
| 4,132,761 | 1/1979 | Mix | 423/242 |
| 4,300,918 | 11/1981 | Cary | 55/486 |
| 4,597,916 | 7/1986 | Chen | 261/94 |
| 4,603,022 | 7/1986 | Yoneda et al. | 261/114 R |
| 4,604,247 | 8/1986 | Chen et al. | 261/94 |
| 4,842,778 | 6/1989 | Chen et al. | 261/97 |
| 4,950,430 | 8/1990 | Chen et al. | 261/112.2 |
| 5,139,544 | 8/1992 | Lucero et al. | 55/257.2 |
| 5,192,466 | 3/1993 | Binkley | 262/114.1 |
| 5,213,719 | 5/1993 | Chuang | 261/114.1 |
| 5,244,604 | 9/1993 | Miller et al. | 261/97 |
| 5,262,094 | 11/1993 | Chuang et al. | 261/97 |
| 5,277,847 | 1/1994 | Gentry et al. | 261/114.1 |
| 5,366,666 | 11/1994 | Chuang et al. | 261/97 |
| 5,389,343 | 2/1995 | Gentry | 422/191 |
| 5,439,510 | 8/1995 | Lerner | 95/273 |
| 5,453,222 | 9/1995 | Lee et al. | 261/114.1 |
| 5,454,989 | 10/1995 | Nutter | 261/114.1 |

OTHER PUBLICATIONS

Chen, Gilbert, "Packed Column Internals," *Chemical Engineering*, pp. 40–51, Mar. 5, 1984.

*Primary Examiner*—Tim R. Miles
*Attorney, Agent, or Firm*—Jenkins & Gilchrist P.C.

[57] ABSTRACT

A method of and apparatus for deentrainment and mass transfer in a chemical process tower. The apparatus comprises a structured packing layer assembled with a second type of packing layer disposed adjacent the underside of a process tower tray. The dual layer assembly reduces liquid entrainment in ascending vapor flow and provides an additional region for mass transfer.

25 Claims, 3 Drawing Sheets

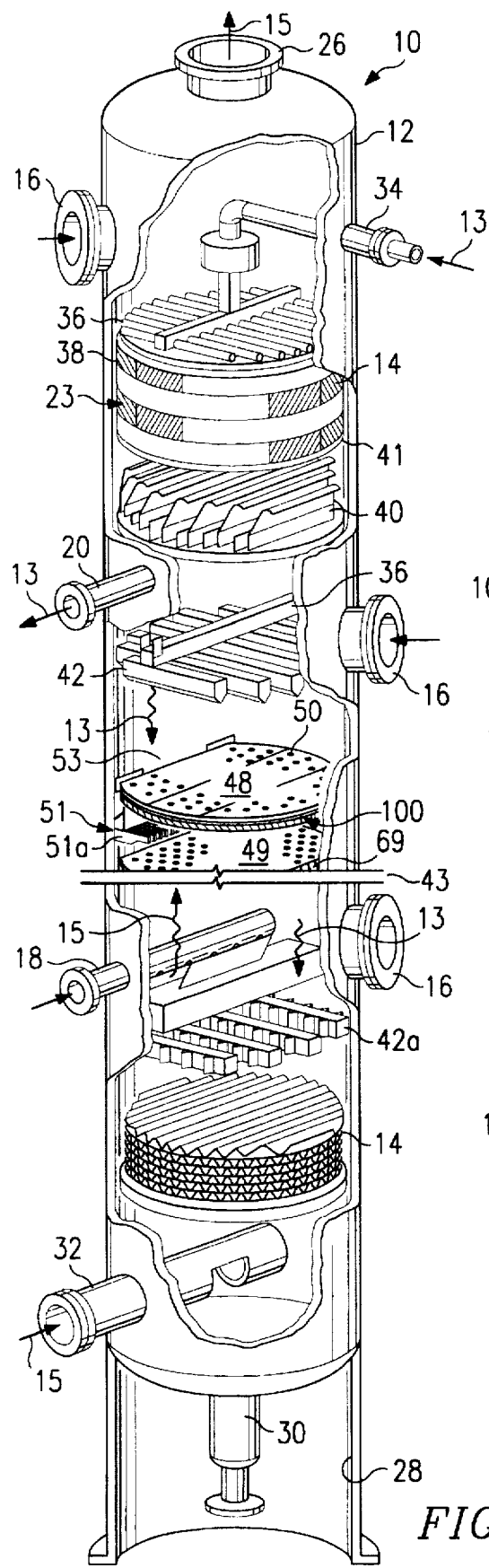
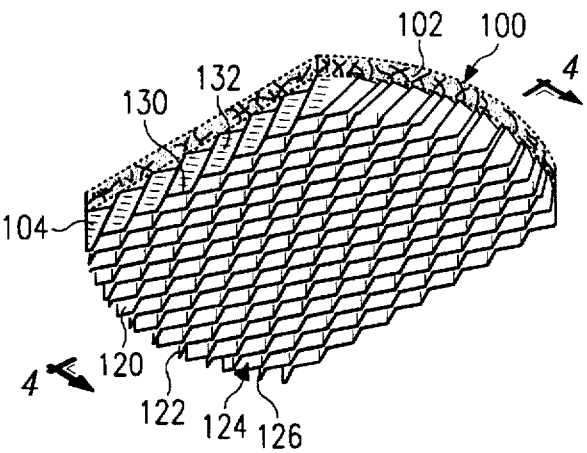
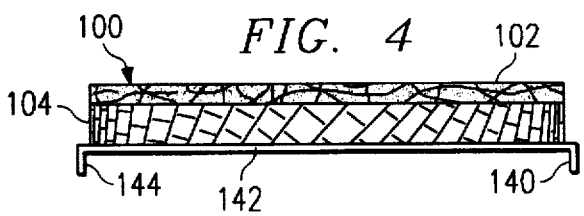

APPARATUS AND METHOD FOR DEENTRAINMENT IN A CHEMICAL PROCESS TOWER

BACKGROUND OF THE INVENTION

1. Field of the Invention

The present invention relates to chemical process towers and, more particularly, but not by way of limitation, to a deentrainment/mass transfer assembly for a trayed tower for reducing entrained liquid in ascending vapor flow and improving mass transfer efficiency therein.

2. History of Related Art

Chemical process towers of the distillation column variety are utilized to separate selected components from a multi-component stream. Generally, such gas-liquid contact columns utilize either trays or packings, and sometimes combinations thereof. In recent years the trend has been to replace the so-called "bubble caps" by sieve and valve trays in most tray column designs, and the popularity of packed columns, either random (dumped) or structured packing have been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high-efficiency packing, has also become popular for certain applications. Such packing is energy efficient, because it has low pressure drop and low liquid hold-up. However, these very properties at times make columns equipped with structured packing difficult to operate in a stable, consistent manner. Moreover, many applications simply require the use of trays.

Fractionation column trays generally come in two configurations: cross-flow and counter flow. The trays generally consist of a solid tray or deck having a plurality of apertures and are installed on support rings secured within the tower. In cross-flow trays, vapor ascends through the apertures and contacts the liquid moving across the tray through the "active" area thereof. It is in this area liquid and vapor mix and fractionation occurs. The liquid is directed onto the tray by means of a vertical channel from the tray above. This channel is generally referred to as the Inlet Downcomer. The liquid moves across the tray and exits through a similar channel generally referred to as the Exit Downcomer. Such downcomers are located where there is a sufficient volume of liquid to effect a liquid-phase, chemical reaction, in the case of catalytic distillation. The location of the downcomers generally determines the flow pattern of the liquid. If there are two Inlet Downcomers and the liquid is split into two streams over each tray, it is called a two-pass tray. If there is only one Inlet and one Outlet Downcomer on opposite sides of the tray, it is called a single-pass tray. For two or more passes, the tray is often referred to as a multipass tray. The number of passes generally increases as the required (design) liquid rate increases. It is the active area of the tray, however, which most directly effects vapor/liquid contact.

Not all areas of a tray are active for vapor/liquid contact. For example, the area under the Inlet Downcomer is generally a solid region, except as reflected in relatively recent patents addressing active inlet areas. To attempt to gain more area of the tray for vapor/liquid contact, the downcomers are often sloped. The maximum vapor/liquid handling capacity of the tray generally increases with an increase in the active or Bubbling Area. There is, however, a limit as to how far one can slope the downcomer(s) in order to increase the Bubbling Area, otherwise the channel will become too small. This can restrict the flow of the liquid and/or restrict the disengagement of vapors retained in the liquid or generated in the downcomers, cause liquid to back up in the downcomer, and thus prematurely limit the normal maximum vapor/liquid handling capacity of the tray.

The technology of gas-liquid contact trays of the type discussed above addresses many performance issues. Examples of this technology are seen in several prior art patents, which include U.S. Pat. Nos. 3,955,419, 4,604,247 and 4,597,916, each assigned to Glitsch, Inc. and U.S. Pat. No. 4,603,022 issued to Mitsubishi Jukogyo Kabushiki Kaisha of Tokyo, Japan. Other performance aspects are addressed in the prior art by the use of baffles, plates and deentrainment devices. For example, U.S. Pat. No. 4,105, 723 and U.S. Pat. No. 4,132,761, both assigned to Merricks Corporation, address special baffle and deentrainment structures which are placed within a process tower. U.S. Pat. No. 5,262,094 (Karl Chuang, et al.) also teaches the utilization of a bed of packing material disposed beneath a fractionation tray.

As referenced above, it is thus known in the industry to utilize a bed-like layer of packing material closely adjacent the bottom surface of a fractionation tray. U.S. Pat. No. 5,262,094, referenced above, refers to the location immediately beneath such a tray as the "disengagement zone." While certain advantages exist therewith, as well as with the other technology developments discussed above, many such devices do not provide maximum capacity and efficiency for chemical process towers meeting the demanding operational parameters of today. One issue, for example, is the manner of installation of such packing material beds in both new towers and existing columns. It is not always feasible to mount an entire assembly immediately beneath a tray. Structural mounting considerations as well as assembly, handling and related size issues must be considered. This is particularly true in retrofitting of existing towers for improving operational efficiency. Existing towers cannot be retrofitted with an assembly without considering related size, handling, and mounting aspects relative to existing hardware already in the tower.

It would be an advantage to provide an assembly which provides both deentrainment and mass transfer to maximize efficiency in chemical process towers. It would also be an advantage to provide such an assembly in a retrofit configuration. The present invention provides such deentrainment and mass-transfer efficiency with flexibility in installation and assembly. By utilizing structured packing with another packing material, and by using discrete tray panel-packing assemblies, the present system can put entrainment to work in the fractionation process. Liquid in the tower is not simply deflected back down to the underlying tray, but instead is trapped and interacted with ascending vapor for effectively achieving mass transfer therebetween. The present invention is thus not simply deentrainment, but deentrainment and mass transfer in an assembly which can be retrofitted in existing towers.

SUMMARY OF THE INVENTION

The present invention relates to a liquid-vapor hold up assembly for affording mass transfer therein and reducing the passage of liquid entrainment therethrough. More particularly, one aspect of the invention comprises a mass transfer assembly for a chemical process tower of the type wherein liquid flows downwardly onto and across trays through which vapor flows upwardly for interaction and mass transfer therewith. One aspect of the invention comprises a dual layer packing assembly secured adjacent the underside of the tray for receiving ascending vapor flow therethrough. The assembly has at least one layer formed from structured packing adapted for collecting liquid entrained in the vapor thereagainst for providing a surface of mass transfer therefrom.

In another aspect, the above-described invention includes the second layer of the dual layer assembly comprising another packing material, which may be wire mesh. The assembly is secured to individual tray panels in discrete assemblies. In one aspect of the invention, the discrete assemblies are banded together and secured to the underside of the tray panel by mounting brackets.

In another aspect, the above described invention includes at least one layer of the packing comprising corrugated structured packing, the corrugations of which are angled one to the other in face to face relationship. The corrugated packing may include planar areas having a surface treatment therein. The surface treatment of the planar areas of the corrugated packing may comprise apertures formed through the packing.

In yet a further aspect, the present invention includes a method of removing entrained liquid from ascending gas in a chemical process tower of the type wherein liquid flows downwardly upon and across trays disposed within the tower and vapor ascends upwardly through the trays for interaction and mass transfer with the liquid. The method comprises the steps of providing a dual layer assembly within the tower for receiving the ascending flow of vapor therethrough. The assembly is then secured adjacent an underside of a tray within the tower, and the ascending vapor passes therethrough for collecting the entrained liquid within the vapor upon the surface of the assembly for mass transfer with the ascending vapor and the improved efficiency of the tower.

Another aspect of the invention includes means for mounting at least one deentrainment assembly to a gas-liquid contact tray of a chemical process tower. The mounting means comprises support brackets that provide securement to an underside portion of a discreet panel of a contact tray and at least one layer of packing having a width and length substantially equivalent to said tray panel for positioning therebeneath and securement thereto by the brackets. In this manner, select portions and/or all of a gas liquid contact tray of the chemical process tower can be fitted with a deentrainment assembly for maximizing the operational efficiency thereof. Additionally, the deentrainment assembly and the deentrainment packing and panel assembly can be individually assembled and loaded into a chemical process tower for both initial assembly of the tower or for the retrofitting of an existing tower.

In another aspect, the present invention includes the packing layer and tray panel assembly described above wherein the support brackets are secured to the packing layer by a plurality of support struts extending transversely therebeneath and thereabove in a sandwiching configuration. In one embodiment, an intermediate band may be utilized around the packing layer for effectively limiting the excess movement of the packing assembly for further enhancing the securement thereof beneath the tray panel.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a fragmentary, perspective view of an illustrative packed exchange tower with various sections cut away for showing a variety of tower internals for reference purposes in the discussion of a chemical process tower;

FIG. 3 is a perspective view of the deentrainment assembly of the present invention, taken from a lower region of the tower;

FIG. 4 is an enlarged side elevational, cross sectional view of the assembly of FIG. 3, taken along lines 4—4 thereof.

DETAILED DESCRIPTION OF EMBODIMENTS

Figure 2:
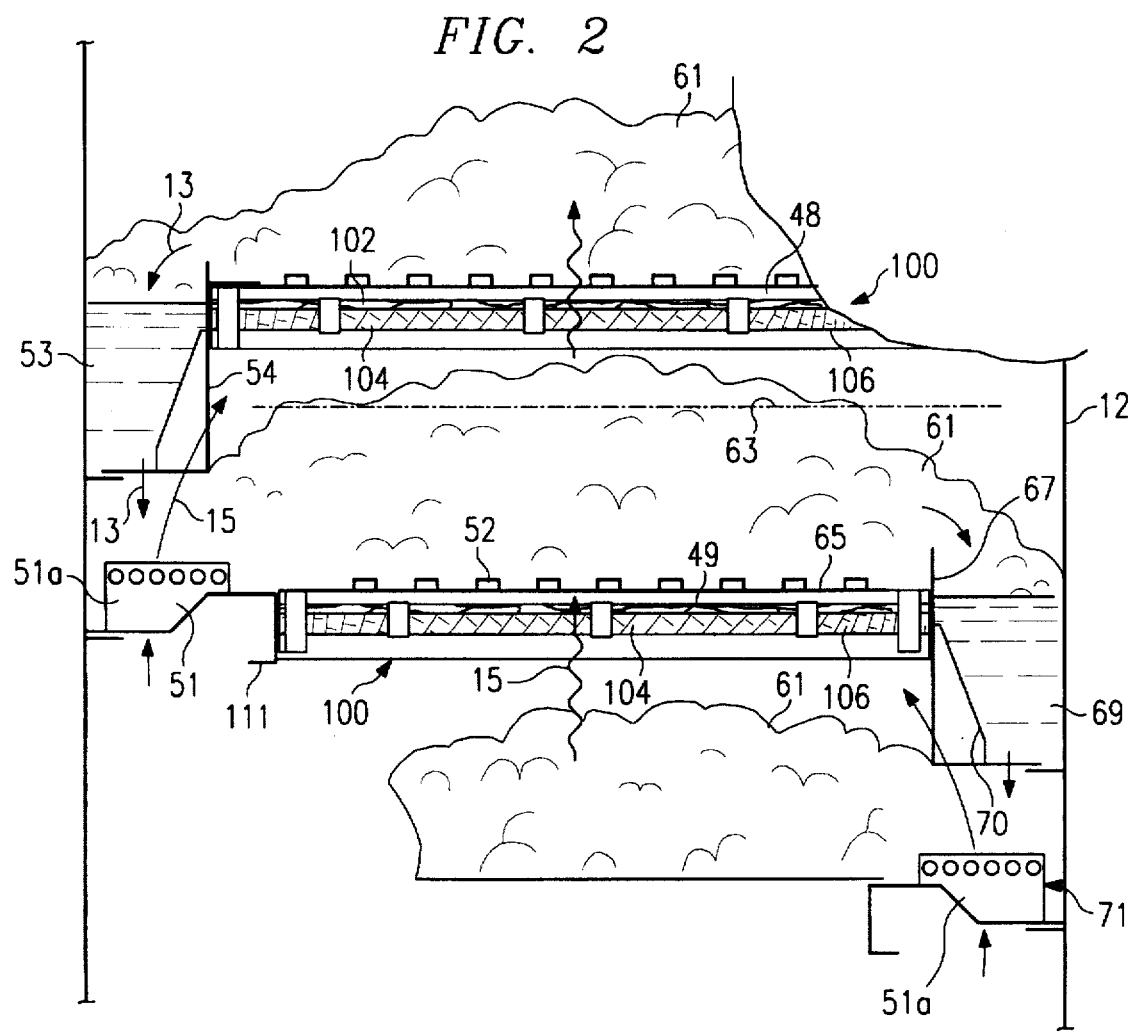
FIG. 2 is a diagrammatic, side elevational, cross sectional view of the deentrainment assembly of the present invention secured within a certain process tower having a vapor tunnel design.

Referring first to FIG. 1, there is shown a fragmentary, perspective view of an illustrative packed exchange tower or column with various sections cut away for showing a variety of tower internals. The exchange column 10 of FIG. 1 is presented for reference purposes only and does not necessarily represent the assembly of a commercially acceptable chemical process tower. What is shown in FIG. 1 is a cylindrical tower 12 having a plurality of packing bed layers 14 and trays disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the tower 12.

In operation, liquid 13 is fed into the column 10 through reflux return line 34 and side stream feed input line 18. The liquid 13 flows downwardly through the tower and ultimately leaves the tower either at side stream draw off line 20, or at bottom stream takeoff line 30. In its downward flow, the liquid 13 is depleted of some material which evaporates from it as it passes through the trays and packing beds, and is enriched or added to by material which condenses into it out of the vapor stream. Vapor stream 15 ascends upwardly through tower 12, as shown herein.

Still referring to FIG. 1, the exchange column 10 is diagrammatically cut in half for purposes of clarity. In this illustration, the column 10 includes a vapor outlet in overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the trays and/or packing bed layers 14. Reflux from condensers is provided in the upper tower region 23 through return line 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper packing bed 38. A liquid distributor 42, adapted for redistributing liquid 13, is likewise disposed therebeneath. A second type of distributor 42a is shown below the cut-line 43 and disposed above bed layers 14. The column 10 is presented with cut-line 43 for illustrating the fact that the tower internals arrangement is diagrammatical only and is provided for referencing various component arrays therein.

Referring still to FIG. 1, an assembly of trays in the column 10 is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Such trays comprise plates which are perforated or slotted in construction. The vapor and the liquid engage at or along the tray and, in some assemblies, are permitted to flow through the same openings in a counter-current flow arrangement. Optimally, the vapor and liquid flows reach a level of stability. With the utilization of downcomers, to be described in more detail below, this stability may be achieved with a relatively low flow rate permitting the ascending vapor to mix with the descending liquid. In some embodiments no downcomers are used, and the vapor and the liquid use the same openings, alternating as the respective pressures change.

In the present illustration, cross-flow trays 18 and 49 and downcomers 53 and 69 are shown. Trays 48 and 49 are of conventional design manifesting a perforated, valved or slotted, surface 50. In this particular embodiment, a plurality of round valves are shown. Above tray 49 and immediately beneath tray 48 is one embodiment of a deentrainment assembly 100 constructed in accordance with the principles of the present invention. The assembly 100 will be described in more detail below.

Many design aspects other than those described above are considered in planning and constructing such a tower. Liquid and vapor flow must be considered, of course. Corrosion is likewise a consideration of the various elements in the packed towers and the selection of the material, design, and the fabrication of the tower internal is, in many instances, the result of such considerations. The anatomy of process columns as shown in FIG. 1 is likewise described in more detail in an article by Gilbert Chen, entitled "Packed Column Internals" appearing in the Mar. 5, 1984 edition of *Chemical Engineering*, incorporated herein by reference.

Referring now to FIG. 2, there is shown a side-elevational, cross-sectional, diagrammatic view of several aspects of the deentrainment assembly of the present invention. Trays 48 and 49 are generally planar panels that are perforated and installed with MINI VALVES and venting chambers 51a. Conical downcomer walls 54 of the type described in U.S. Pat. No. 5,453,222 assigned to Glitsch, Inc. may also be used. Likewise, other tray surfaces and downcomer designs may, of course, be used in accordance with the principles of the present invention.

Still referring to FIG. 2, liquid 13 travels down a chordal downcomer 53 comprising generally semi-conaical walls 54, from tray 48 disposed thereabove. The generally semi-conical walls 54 of the downcomer 53 provide a tunnel for vapor flow 15 from the chambers 51a, which tunnel affords a combination horizontal-vertical flow vector to the vapor vented through venting chambers 51a. The liquid 13 engages the vented vapor 15 discharged from the chambers 51a of trough section 51 beneath the downcomer 53. Entrained gas escaping from the lower downcomer below the venting region is able to ascend directly into and through the chambers 51a. Without the venting chambers 51a, in this particular embodiment, there would be no preferential vapor flow of the gas escaping from the downcomer and all vapor would then tend to rise through the conventional active region 52. This engagement controls the direction of vented vapor and liquid flow across the central active region 52 of tray 49; the taper of the generally semi-conical walls 54 imparting a combination horizontal-vertical flow characteristic to the vapor. The chambers 51a permit any excess vapor pressure to be vented through the trough section 51 and into a flow configuration which facilitates proper tower operation rather than creating more problems. For example, as described in U.S. Pat. No. 5,453,222, the vapor tunnel of walls 54 prevents choking, promotes vapor liquid interaction and entrained liquid is induced to drop out due to the flow configuration. The remaining ascending vapor 15 passing through the plurality of holes of said active region 52 may rise vertically to create a froth 61. The froth or "foam" is a region of aeration in which the phase of the liquid 13 is continuous. When the froth 61 does not exist or becomes discontinuous, an inversion to a gas-continuous regime can result in a "spray" of gas upwardly therethrough.

Referring still to FIG. 2, a deentrainment assembly 100 is secured beneath each of upper tray 48 and lower tray 49. The deentrainment assembly 100 is shown, in this diagrammatical illustration, to comprise a dual packing layer assemblage. The top layer 102 of each assembly 100 is formed of another packing material, such as wire mesh. The lower layer 104 disposed beneath mesh layer 102 is formed of structured packing. The specific assembly and types of packing will be described in more detail below. What is shown herein, for purposes of illustration, is a diagrammatical illustration of the deetrainment assembly 100 positioned within the tower 12 for purposes of discussion. Support for the deetrainment assembly 100 will be shown and discussed in more detail below. A diagrammatical illustration of a support grid 106 is thus shown for supporting said deetrainment assembly 100. A variety of support configurations are possible in accordance with the principles of the present invention, and one specific configuration will hereinafter be described.

Still referring to FIG. 2, the froth 61 extends with a relatively uniform height, shown in phantom by line 63 across the width of the tray 49 to the opposite end 65 where a weir 67 is established for maintaining the froth height 63. The accumulated froth at this point flows over the top of the weir 67 into associated downcomer 69 that carries the froth downwardly into generally semi-conical region 70 where the liquid accumulates and disperses upon the venting chambers 51a of trough section 71 therebeneath. Trough section 71 is shown herein in a diagrammatic fashion for purposes of illustration only. The area of holes and perforations for a single crossflow plate establishes the active length of the plate and the zone in which the froth 61 is established. It should be noted that the deentrainment assembly 100 of the present invention would also be applicable to multiple downcomer configurations, wherein downcomers and troughed sections 51 and 71 may be positioned in intermediate areas of the trays. By increasing the total active area by active venting chambers 51a greater capacity is achieved.

Referring now to FIG. 3, there is shown a perspective view of a portion of a deetrainment assembly 100, of the general type shown in FIG. 1, removed from the tower 12 and viewed from a lower region thereof. The assembly 100 is formed with a top layer 102 comprising another packing material. In the preferred embodiment, this packing material is wire mesh. Wire mesh packing of this type has been used in process towers for many years. The wire mesh is generally made of 0.011 inch diameter wire which produces a maze of criss-crossing wires that effectively requires fluid passing therethrough to take a circuitous path through the interstitial regions thereof. A wire mesh packing of this general type is set forth and described in U.S. Pat. No. 3,218,048 entitled "Packing for Fractionating Column and the Like". As described therein, wire strands are woven or knitted, or otherwise fabricated to form a fabric layer having a mesh of such size that the inner strand openings are not filmed over by liquid passing therethrough, but remain open for the passage of gases while liquid may flow along the surfaces of the strands and through the capillary passages between the strands. This fabric has been referred to as a non-filming mesh. This is but one example of a wire mesh of the type that may be used in the layer 102 in accordance with the principles of the present invention.

Referring still to FIG. 3, the structured packing 104 lying beneath the mesh packing 102 is preferably formed from a plurality of corrugated plates 120. A variety of structured packing configurations have been used in the chemical processing industry, and several configurations are represented in U.S. Patents that are assigned to Glitsch, Inc. One such patent, U.S. Pat. No. 4,950,430, shows structured tower packing for vapor liquid contact which includes a plurality of sheet arranged generally vertically, aligned parallel to one another with the corrugations of adjacent sheets crisscrossing one another. As set forth in said patents, the sheets are provided with a plurality of holes for effecting both liquid and vapor distribution in said packing. Such holes and/or other surface treatment appearing on sheets may be utilized in accordance with the principles of the present invention. U.S. Pat. No. 4,604,247, also assigned to Glitsch, Inc., shows another embodiment of such surface treatment which may be utilized in accordance with the principles of the present invention.

In accordance with the above, the sheets 120 are shown with corrugation fold lines 122 arranged at angles so that they criss-cross when adjacent plates 120 are disposed in face to face relationship. In this way, there are formed a number of troughs, or generally triangularly cross section passages, which are angled upwardly so far as gas flow is concerned and which are angled downwardly so far as liquid flow is concerned, the passages being open topped and intersecting repeatedly other passages of sheets of opposite angulation. A triangular shaped passage 124 is thus defined by a corrugated sheet 126, which extends upwardly and terminates against upper packing layer 102. A surface treatment 130 is diagrammatically illustrated on a portion of the corrugated sheet 132 for purposes of illustration, as described above. The surface treatment 130 may include surface irregularities of a wide variety of shapes and/or apertures. A variety of surface patterns may be incorporated for a particular application. Likewise, a smooth sheet without apertures may also be utilized in accordance with the principles of the present invention.

Referring now to FIG. 4, there is shown a side-elevational, cross-sectional view of a deentrainment assembly 100 of the present invention. FIGS. 3 and 4 show said deentrainment assembly in size proportions that are more akin to test columns than commercial installations wherein the diameter of the tray is generally much greater than the height of said deentrainment assembly. Notwithstanding the above, the mesh packing layer 102 as shown herein is disposed atop the structured packing layer 104. Although the deentrainment assembly 100 is not shown installed in a tower, as it is in FIG. 2, one embodiment of a support grid 140 is shown for supporting a deentrainment assembly 100 underlying substantially all of a tray within a process column. Another support configuration is described below relative to FIG. 5. The grid 140 of the present embodiment contains a plurality of horizontal support elements 142 contiguous a vertical element or bracket 144. The bracket 144 may be welded or otherwise secured to and adjacent a tower element. Other embodiments of the support grid may also include a cage which substantially encompasses the deentrainment assembly 100 and secures said assembly to the process column tray.

Test

In one test of the present invention, a distillation test was performed using a special deentrainment fixture attached to the underside of a fixed mini-valve tray. The test was conducted in a methanol/water system similar to the commercial applications, i.e., 99% methanol concentration. The special deentrainment fixture housed a combination of mesh packing and a structured packing of the type manufactured by Glitsch, Inc. The result of the test showed that a fixed mini-valve tray with the deentraining fixture offered at least a 15% capacity improvement over the regular fixed mini-valve tray, while maintaining the same high efficiency with no (sharp efficiency reduction due to liquid entrainment.

Figure 5:
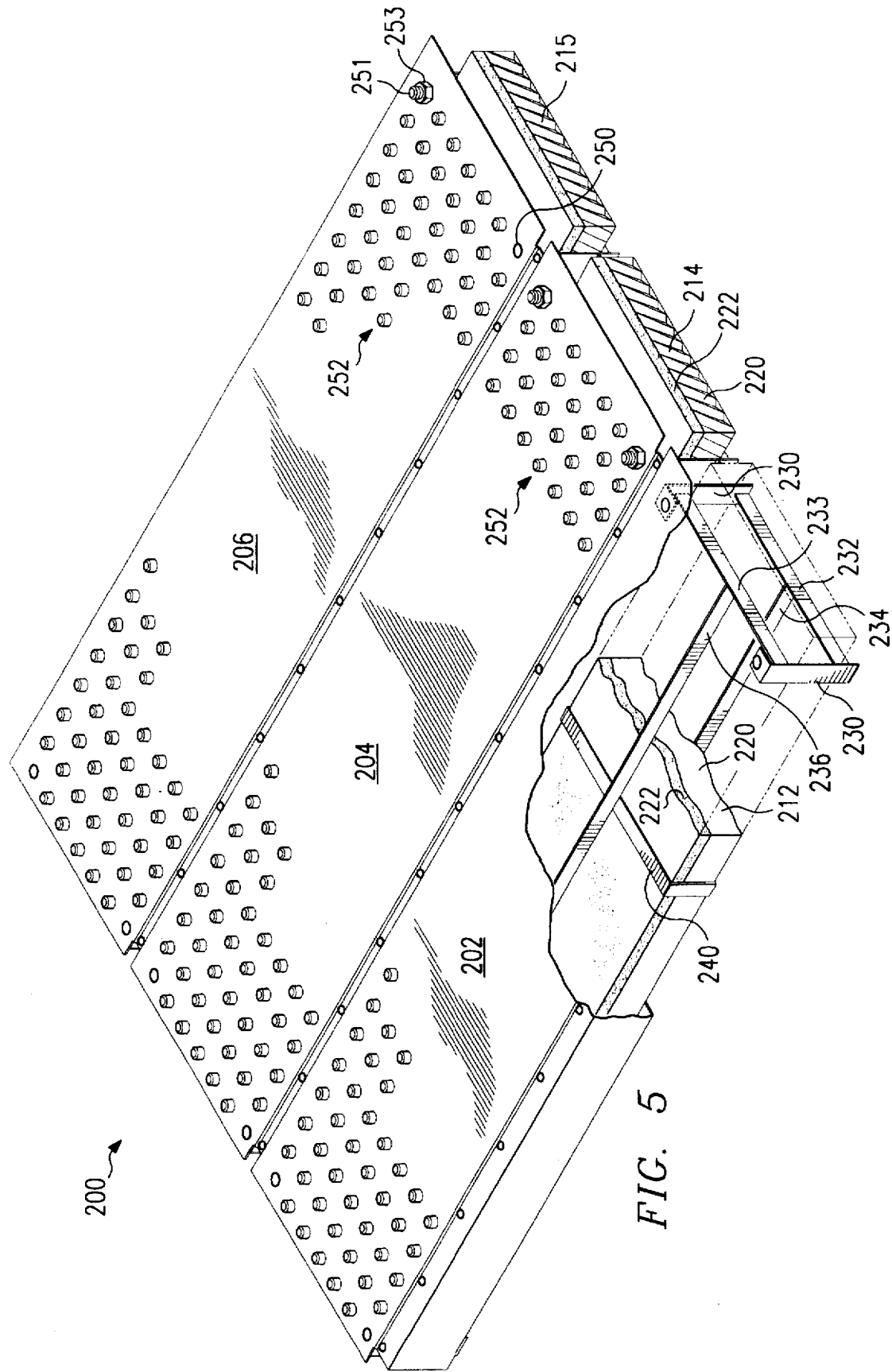
FIG. 5 is a perspective view of an alternative embodiment of a mounting configuration for the deentrainment assembly of the present invention.

Referring now to FIG. 5, there is shown a perspective view of a gas liquid contact tray 200 constructed from a plurality of panel sections 202, 204, 206. The first panel section 202 has secured therebeneath a deentrainment assembly 212. Deentrainment assemblies 214 and 215 are also mounted beneath panels 204 and 206, respectively. Each assembly 212, 214 and 215 is constructed of a width and length substantially equivalent to the length and width of the respective panel sections 202, 204 and 206. As shown herein, the assemblies 212, 214 and 215 contain a first structured packing layer 220 and a packing layer 222 formed of a second type of packing, such as mesh packing. Various packing layer combinations are possible in accordance with the principles of the present invention and the operational criteria of the process column.

Still referring to FIG. 5, the deentrainment assemblies 212, 214 and 215 are secured to the tray panels 202, 204 and 206 by a plurality of brackets 230, each depending from the underside of said panels. The brackets 230 are aligned in generally parallel spaced relationship with one another in support of lower transverse struts 232 underlying the packing layers 220 and 222. A lower longitudinal strut 234 connects and is supported by transverse struts 232. Upper transverse struts 233 are also supported by brackets 230 and support longitudinal strut 236. Struts 232, 233, 234, and 236 thus sandwich the packing layers 220 and 222 therebetween and structurally connect said packing layers to said tray panel. Modifications of the lower struts 232 and 234 or upper struts 233 and 236 may be necessary for particular packing materials and/or operational specifications within the process tower. Intermediate bands 240 may likewise be incorporated for structural stability. The bands 240 are shown in this particular view to be disposed generally along and intermediately of the ends of packing layers 220 and 222 in securement of the two packing materials therein. Utilization of the bands further enhances the structural integrity of the assembly as well as improving the handling thereof for insertion and/or removal to the tray and/or from the tower.

Still referring to FIG. 5, individual panels 202, 204, 206 of a particular tray 200 may be fitted with one or more packing layers to enhance the operation of the tower. In some instances, although not shown in FIG. 5, certain panels may not be assembled with said packing. Existing towers may likewise be retrofitted with such an assembly by utilizing existing apertures in the tray surface. As shown in FIG. 5, gas flow apertures 250 which normally include circular valves 252 have been utilized for the securement of the bracket 230. In this particular view, a conventional threaded member, such as a bolt 251, extends through the bracket 230 and through the tray aperture 250 and is secured thereagainst with a conventional nut 253 for the securement of the packing layers 220 and 222 therebeneath.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A mass transfer, deentrainment assembly for a chemical process tower of the type wherein liquid flows downwardly onto and across trays through which vapor flows upwardly for interaction and mass transfer with said liquid, said assembly comprising:
   a dual layer packing assembly secured adjacent one of said trays for receiving ascending vapor flow therethrough and having at least one layer formed from structured packing adapted for collecting liquid entrained in said vapor thereagainst for providing a surface for mass transfer therefrom;
   said structured packing comprising a plurality of corrugated plates, wherein corrugations of adjacent plates are angled one to the other in face to face relationship, and wherein each of said corrugated plates includes planar areas having a surface treatment therein.

2. The apparatus as set forth in claim 1 wherein a second layer of said dual layer assembly comprises another packing element.

3. The apparatus as set forth in claim 1 wherein said assembly is secured to an underside of said one of said trays.

4. The apparatus as set forth in claim 1 wherein said surface treatment of said planar areas comprises apertures formed through said plates.

5. The apparatus as set forth in claim 1 wherein said assembly is secured to said tray by an undercarriage.

6. The apparatus as set forth in claim 5 wherein said undercarriage comprises a metal grid.

7. The apparatus as set forth in claim 5 wherein said undercarriage comprises a plastic grid.

8. A method of removing entrained liquid from ascending gas in a chemical process tower of the type wherein liquid flows downwardly upon and across trays disposed within said tower and vapor ascends upwardly through said trays for interaction and mass transfer with said liquid, said method comprising the steps of:
   forming a dual layer packing assembly comprising at least one layer of structured packing, said structured packing comprising a plurality of corrugated plates, wherein corrugations of adjacent plates are angled one to the other in face to face relationship, and wherein each of said corrugated plates includes planar areas having a surface treatment therein;
   positioning said assembly within said tower for receiving the ascending flow of vapor therethrough;
   securing said assembly adjacent an underside of a tray within said tower;
   introducing vapor and liquid into said tower for counter current flow therein; and
   collecting liquid entrained within said vapor upon surfaces of said assembly for mass transfer with said vapor and improved efficiency of said tower.

9. The method as set forth in claim 8 wherein said step of forming said dual layer packing assembly comprises forming said assembly from another packing element.

10. The method as set forth in claim 8 wherein said surface treatment of said planar areas comprises apertures formed through said plates.

11. The method as set forth in claim 8 wherein said step of securing said assembly adjacent an underside of a tray comprises securing said assembly to said tray by an undercarriage.

12. The method as set forth in claim 11 wherein said undercarriage comprises a metal grid.

13. The method as set forth in claim 11 wherein said undercarriage comprises a plastic grid.

14. A deentrainment assembly for a gas liquid contact tower of the type having gas liquid contact trays disposed therein for accommodating generally counter current flow of liquid thereacross and gas therethrough, said assembly comprising:
   at least one packing assembly for gas-liquid deentrainment;
   said trays being constructed with a plurality of panels having a top side for liquid flow thereacross and a bottom side for receiving ascending gas flow therethrough;
   at least one of said tray panels having a width substantially equivalent to the width of said packing assembly; and
   means for securing said packing assembly to said bottom side of said at least one of said tray panels for segmented assembly within said tower.

15. The apparatus as set forth in claim 14 wherein said securement means comprises a plurality of angle brackets configured for securement to the underside of said tray panel, said brackets being configured on first end for securement to said tray panel and on a second opposite end to means for support of said packing assembly.

16. The apparatus as set forth in claim 15 wherein said means for the support of said packing assembly comprises a mounting strut adapted for securement to said second end of said bracket for extending beneath said packing assembly in support thereof.

17. The apparatus as set forth in claim 16 and further including an upper packing assembly support strut extending across said packing assembly beneath said tray panel for securement of said packing assembly therebeneath.

18. The apparatus as set forth in claim 17 wherein said struts comprise elongated metal plates extending between said brackets for the support of said packing assembly.

19. The apparatus as set forth in claim 14 wherein said packing assembly includes structured packing.

20. The apparatus as set forth in claim 19 wherein said packing assembly further includes a second packing material of another type assembled therewith.

21. The apparatus as set forth in claim 20 wherein said another type of packing material comprises wire mesh packing.

22. The apparatus at set forth in claim 21 wherein said structured packing comprises a plurality of corrugated plates, wherein corrugations of adjacent plates are angled one to the other in face to face relationship, and wherein each of said corrugated plates includes planar areas having a surface treatment therein.

23. A method of reducing entrainment while extending the operating range and maintaining efficiency in a chemical process tower of the type having trays secured therein, said trays being constructed of individual panels, said method comprising the steps of:

providing structured packing;

forming a deentrainment fixture from said structured packing;

constructing said deentrainment fixture for said chemical process tower tray in discrete bales of a size generally equivalent to that of one of said panels of said chemical process tower tray; and mounting said individual bales of said deentrainment fixture to the underside of individual ones of said tray panels for individual mounting within said chemical process tower.

24. The method as set forth in claim 23 wherein said step of constructing said deentrainment fixture comprises forming at least one layer of wire mesh packing adapted for positioning upon said structured packing.

25. The method as set forth in claim 24 wherein said structured packing comprises a plurality of corrugated plates, wherein corrugations of adjacent plates are angled one to the other in face to face relationship, and wherein each of said corrugated plates includes planar areas having a surface treatment therein.

* * * * *

UNITED STATES PATENT AND TRADEMARK OFFICE
CERTIFICATE OF CORRECTION

PATENT NO. : 5,762,668
DATED : June 9, 1998
INVENTOR(S) : Lee, et al

It is certified that error appears in the above-identified patent and that said Letters Patent is hereby corrected as shown below:

On the title page, under item [56], insert the following:

U. S. PATENT DOCUMENTS

| PATENT NUMBER | | | | | | | ISSUE DATE | PATENTEE |
|---|---|---|---|---|---|---|---|---|
| 2 | 4 | 9 | 0 | 0 | 7 | 9 | 12/49 | F. L. Melvill |
| 3 | 4 | 6 | 6 | 1 | 5 | 1 | 9/69 | L. Sicard et al. |
| | | | | | | | | |

FOREIGN PATENT OR PUBLISHED FOREIGN PATENT APPLICATION

| DOCUMENT NUMBER | | | | | | | PUBLICATION DATE | COUNTRY OR PATENT OFFICE | |
|---|---|---|---|---|---|---|---|---|---|
| EP | 0 | 1 | 8 | 83 | 8 | 7 | 07/86 | European Patent Office | |
| FR | 1 | 3 | 7 | 75 | 3 | 7 | 02/65 | France | |
| | | | | | | | | | |

Signed and Sealed this

Second Day of March, 1999

Attest:

Q. TODD DICKINSON

*Attesting Officer*   *Acting Commissioner of Patents and Trademarks*